(12) United States Patent
Kobayashi

(10) Patent No.: US 7,213,237 B2
(45) Date of Patent: May 1, 2007

(54) INTERMEDIATE CODE PREPROCESSING APPARATUS, INTERMEDIATE CODE EXECUTION APPARATUS, INTERMEDIATE CODE EXECUTION SYSTEM, AND COMPUTER PROGRAM PRODUCT FOR PREPROCESSING OR EXECUTING INTERMEDIATE CODE

(75) Inventor: Tetsuyuki Kobayashi, Tokyo (JP)

(73) Assignee: Aplix Corporation, Shinjuku-ku, Tokyo (JP)

( * ) Notice: Subject to any disclaimer, the term of this patent is extended or adjusted under 35 U.S.C. 154(b) by 656 days.

(21) Appl. No.: 10/283,806

(22) Filed: Oct. 29, 2002

(65) Prior Publication Data

US 2003/0084432 A1 May 1, 2003

(30) Foreign Application Priority Data

| Oct. 31, 2001 | (JP) | ............................ 2001-334823 |
| Oct. 31, 2001 | (JP) | ............................ 2001-334825 |

(51) Int. Cl.
*G06F 9/45* (2006.01)

(52) U.S. Cl. ..................................... 717/139; 717/146

(58) Field of Classification Search ............... 717/114, 717/148
See application file for complete search history.

(56) References Cited

U.S. PATENT DOCUMENTS

| 5,598,561 | A | * | 1/1997 | Funaki ....................... 717/149 |
| 5,889,996 | A | | 3/1999 | Adams |
| 5,923,878 | A | | 7/1999 | Marsland |
| 6,021,273 | A | | 2/2000 | Griesemer |
| 6,141,732 | A | | 10/2000 | Adams |
| 6,212,678 | B1 | * | 4/2001 | Marsden ..................... 717/139 |
| 6,256,784 | B1 | | 7/2001 | Grove |
| 6,321,323 | B1 | * | 11/2001 | Nugroho et al. .............. 712/34 |
| 6,332,215 | B1 | | 12/2001 | Patel et al. |

(Continued)

FOREIGN PATENT DOCUMENTS

JP    2001-101010 A    4/2001

(Continued)

OTHER PUBLICATIONS

Manthey et al., "A Model for and Discussion of Multi-Interpreter Systems", Communications of the ACM, vol. 22, No. 5, May 1979, pp. 299-309.*

(Continued)

*Primary Examiner*—Meng-Al T. An
*Assistant Examiner*—William H. Wood
(74) *Attorney, Agent, or Firm*—Morrison & Foerster LLP

(57) ABSTRACT

This intermediate code execution system has a first subsystem having a first interpreter which corresponds to an instruction set generated during compilation and sequentially interprets and executes instructions included in an intermediate code, a second subsystem having a preprocessing section which applies to the intermediate code preprocessing to substitute an instruction pattern consisting of a plurality of instructions with an alternative instruction, and a second interpreter which corresponds to an instruction set including the alternative instruction and sequentially interprets and executes an instruction code included in the preprocessed intermediate code, and a method analysis section which selects either processing to execute the intermediate code by the first interpreter or processing to apply preprocessing to the intermediate code by the preprocessing section and then execute the intermediate code by the second interpreter.

4 Claims, 7 Drawing Sheets

U.S. PATENT DOCUMENTS

| | | | |
|---|---|---|---|
| 6,332,216 B1 * | 12/2001 | Manjunath | 717/141 |
| 6,408,384 B1 | 6/2002 | Adams | |
| 6,470,424 B1 | 10/2002 | Adams | |
| 6,578,020 B1 | 6/2003 | Nguyen | |
| 6,668,325 B1 * | 12/2003 | Collberg et al. | 713/194 |
| 6,854,113 B1 | 2/2005 | Sankar et al. | |
| 2002/0053072 A1 | 5/2002 | Steinbusch et al. | |
| 2002/0104076 A1 | 8/2002 | Shaylor | |

FOREIGN PATENT DOCUMENTS

| | | |
|---|---|---|
| WO | WO 01/22213 A2 | 3/2001 |

OTHER PUBLICATIONS

Office Action mailed Jul. 14, 2005 for U.S. Appl. No. 10/283,473 filed Oct. 29, 2002, 13 pages.

I. Piumarta et al., "Optimizing direct threaded code by selective inlining", ACM Sigplan Notices, Assoc. for Computing Machinery, vol. 33, No. 5, May 1, 1998, pp. 291-300.

Haruna et al., "Java Translation Scheme for Consumer Electronics Home Network", Info-Tech and Info-Net, proceedings, vol. 3, Oct. 29, 2001, pp. 220-225.

* cited by examiner

| (Instruction pattern) | (Alternative instruction) |
|---|---|
| iload 8<br>iload 9<br>iadd | v_ v_ iadd 8, 9 |
| ⋮ | ⋮ |

FIG. 3

| Intermediate code | First stage | Second stage |
|---|---|---|
| iload 8<br>iload 9<br>iadd | nop<br>nop<br>v_ v_ iadd 8, 9 | v_ v_ iadd 8, 9 |

FIG. 4

| | Intermediate code execution section 30A | Intermediate code execution section 30B | Intermediate code execution section 30C |
|---|---|---|---|
| Bytecode instruction a | 90 | 10 | 10 |
| Bytecode instruction b | 10 | 15 | 90 |
| Bytecode instruction c | 90 | 25 | 15 |
| Bytecode instruction d | 50 | 40 | 90 |
| . | . | . | . |
| . | . | . | . |

INTERMEDIATE CODE PREPROCESSING APPARATUS, INTERMEDIATE CODE EXECUTION APPARATUS, INTERMEDIATE CODE EXECUTION SYSTEM, AND COMPUTER PROGRAM PRODUCT FOR PREPROCESSING OR EXECUTING INTERMEDIATE CODE

CROSS-REFERENCE TO RELATED APPLICATIONS

This application is based upon and claims the benefit of priority from the prior Japanese Patent Applications No. 2001-334823, filed Oct. 31, 2001; and No. 2001-334825, filed Oct. 31, 2001, the entire contents of both of which are incorporated herein by reference.

BACKGROUND OF THE INVENTION

1. Field of the Invention

The present invention relates to an intermediate code preprocessing apparatus which applies preprocessing to an intermediate code in order to improve execution speed of the intermediate code by, e.g., a virtual machine, an intermediate code execution apparatus which executes the intermediate code subjected to the preprocessing, an intermediate code execution system, and a computer program product used to apply the preprocessing to the intermediate code or execute the intermediate code.

2. Description of the Related Art

For the purpose of providing a program which does not depend on the platform of a computer such as hardware or OS, there has been proposed a method of constructing a virtual machine (VM) on each platform by software techniques or hardware techniques and executing an intermediate code between source code and object code on the virtual machine. As one of the program languages adopting such a method, there is Java™, which adopts a form of intermediate code called a class file. It is to be noted that the hardware and the virtual machine constructed on the hardware may be collectively referred to as an intermediate code execution system hereinafter.

According to the above-described method, since single program code can be supplied to various platforms and executed, it is no longer necessary to prepare object code which can be executed only on each platform. As a result, not only distribution of the program can be simplified, but software development can be made efficient. Therefore, virtual machines have been built on various computer platforms. Further, in recent years, construction of virtual machines on processors has also been started in various electronic devices (which will be referred to as an embedded device hereinafter) having a processor mounted therein.

Here, as the virtual machine, there is known one which is of an interpreter type which is provided on the platform in the form of software and sequentially interprets and executes bytecode instructions included in a class file. The interpreter type virtual machine requires a process of taking out bytecode instructions one by one from the class file and interpreting their contents. This process becomes the overhead in the prior art, and the excellent performance cannot be obtained.

Thus, there has been proposed a JIT compiler (Just In Time Compiler) system, an AOT compiler (Ahead Of Time Compiler) or the like which compiles the class file into native code inherent to each type of hardware and then executes it for the purpose of improving performance. Furthermore, there has been attempted construction of a virtual machine in the form of hardware like a Java™ chip which is specially designed to enable direct execution of bytecode instructions.

In the compiler system such as JIT or AOT mentioned above, since the native code of the processor is executed, it is superior to the interpreter system when taking notice only of speed of instruction execution. The compiler system, however, requires a work area for the compile operation itself or an area for storing the native code, which is four to ten times the size of the class file, and hence a larger quantity of memory is disadvantageously required than in the interpreter system. Such a problem is prominent in an embedded device in which restriction in hardware resources is greater than that in a regular computer in particular. Moreover, when starting compile after directing execution of the class file, the compilation operation becomes the overhead, and sufficient performance may not be obtained.

In addition, according to the Java™ chip mentioned above, although the class file can be executed with high performance without performing compilation, a large development cost is required in development of such a dedicated chip, and an increase in the cost of the chip itself is inescapable. Additionally, in view of the fact that version upgrade or bug fixing is appropriately performed in the language specification according to advancement in technology or needs in the market, there is an aspect that constructing the virtual machine in the form of hardware is not necessarily preferable. In particular, in the virtual machine in the embedded device, adoption of a Java™ chip is not realistic because of the combination of strong demands for reduction in cost and version updating of the specification in a short cycle.

As described above, it is hard to apply the virtual machine such as the compiler system or the Java™ chip in an embedded device or the like. Therefore, a technique which improves the performance during execution of the intermediate code has been demanded on the assumption of application in an embedded device.

BRIEF SUMMARY OF THE INVENTION

It is an object of the present invention to provide an intermediate code preprocessing apparatus which improves execution speed by applying preprocessing to intermediate code executed by a virtual machine, an intermediate code execution apparatus which can be preferably applied in an embedded device and preprocess the intermediate code at high speed, and a computer program product which applies the preprocessing or executes the intermediate code.

To achieve this aim, according to a first aspect of the present invention, there is provided an intermediate code preprocessing apparatus which applies preprocessing to intermediate code obtained by compiling source code created in a predetermined program language, characterized by comprising: a storage section which stores intermediate code; and a processing section which executes substitution of a specific instruction pattern included in the intermediate code stored in the storage section with an alternative instruction previously associated with the specific instruction pattern.

Further, according to a second aspect of the present invention, there is provided an intermediate code execution apparatus which executes intermediate code obtained by compiling source code created in a predetermined program language, characterized by comprising: a storage section which stores intermediate code; and a processing section which executes the following processing: a) substitution of a specific instruction pattern consisting of a plurality of instructions included in the intermediate code stored in the storage section with an alternative instruction previously associated with the specific instruction pattern; and b) interpretation of the alternative instruction as processing substantially equivalent to the specific instruction pattern and execution of the same when sequentially interpreting and executing the intermediate code in which the specific instruction pattern has been substituted with the alternative instruction.

Furthermore, according to a third aspect of the present invention, there is provided a computer program product which applies preprocessing to intermediate code obtained by compiling a source code created in a predetermined program language, characterized by comprising a processing section used to execute substitution of a specific instruction pattern included in the intermediate code with an alternative instruction previously associated with the specific instruction pattern.

Moreover, according to a forth aspect of the present invention, there is provided a computer program product which executes intermediate code obtained by compiling source code created in a predetermined program language, characterized by comprising a processing section used to execute the following processing: a) substitution of a specific instruction pattern consisting of a plurality of instructions included in the intermediate code with an alternative instruction previously associated with the specific instruction pattern; b) interpretation of the alternative instruction as processing with low redundancy which is substantially equivalent to the specific instruction pattern and execution of the same when interpreting and executing the intermediate code in which the specific instruction pattern has been substituted with the alternative instruction.

In addition, according to a fifth aspect of the present invention, there is provided an intermediate code execution apparatus which executes intermediate code obtained by compiling source code created in a predetermined program language, characterized by comprising: a plurality of intermediate code execution sections which execute the intermediate code; a storage section which stores intermediate code and also stores a correspondence relationship between an instruction included in the intermediate code and appropriateness of each the intermediate code execution sections for efficient execution of the instruction; and an intermediate code interpretation section which executes the following processing: a) identification of the instructions included in the intermediate code stored in the storage section; b) determination of an appropriate one from the intermediate code execution sections for efficient execution of the intermediate code based on the identified instructions and the correspondence relationship; and c) recording of a relationship between the intermediate code and the appropriate intermediate code execution section.

Additionally, according to a sixth aspect of the present invention, there is provided an intermediate code execution apparatus which executes intermediate code obtained by compiling source code created in a predetermined program language, characterized by comprising: a special intermediate code execution section; a general intermediate code execution section; a storage section having intermediate code stored therein; and an intermediate code analysis section which executes the following: a) analysis of the intermediate code stored in the storage section and judgment upon whether an instruction inexecutable by the special intermediate code execution section is contained in instructions included in the intermediate code; b) recording that the intermediate code should be executed by the special intermediate code execution section when the inexecutable instruction is not contained in the intermediate code, and recording that the intermediate code should be executed by the general intermediate code execution section when the inexecutable instruction is contained in the intermediate code.

Further, according to an seventh aspect of the present invention, there is provided an intermediate code execution system which executes intermediate code obtained by compiling source code created in a predetermined program language, characterized by comprising: a storage section having intermediate code stored therein; a preprocessing section which applies to the intermediate code stored in the storage section preprocessing to substitute a specific instruction pattern included in the intermediate code with an alternative instruction previously associated with the specific instruction pattern; a first interpreter which cannot interpret and execute the alternative instruction; a second interpreter which can interpret the alternative instruction as content equivalent to the instruction pattern before substitution and execute the alternative instruction; and an intermediate code analysis section which analyzes the intermediate code processed by the preprocessing section, makes judgment upon whether the alternative instruction is included in the intermediate code, records that the intermediate code should be executed by the first interpreter when the alternative instruction is included, and records that the intermediate code should be executed by the second interpreter when the alternative instruction is not included.

Furthermore, according to a ninth aspect of the present invention, there is provided an intermediate code execution system which executes intermediate code obtained by compiling source code created in a predetermined program language, characterized by comprising: a first subsystem having a first interpreter which can interpret and execute all instructions created during compilation; a second subsystem having a preprocessing section which applies preprocessing to substitute an instruction pattern consisting of a plurality of instructions included in the intermediate code with an alternative instruction, and a second interpreter which can interpret the alternative instruction as content equivalent to the instruction code before substitution and execute the alternative instruction; and a selection section which selects either processing to execute the intermediate code by the first interpreter in the first subsystem or processing to apply preprocessing to the intermediate code by the preprocessing section and then execute the preprocessed intermediate code by the second interpreter in the second subsystem in accordance with the intermediate code to be executed.

Moreover, according to a ninth aspect of the present invention, there is provided an intermediate code execution system which executes intermediate code obtained by compiling source code created in a predetermined program language, characterized by comprising: a first subsystem having a preprocessing section which applies preprocessing to substitute a first instruction pattern consisting of a plurality of instructions included in the intermediate code with a first alternative instruction, and a first interpreter which can interpret the first alternative instruction as content equivalent to the first instruction pattern and execute the first alternative instruction; a second subsystem having a preprocessing section which applies preprocessing to substitute a second instruction pattern included in the intermediate code with a second alternative instruction, and a second interpreter which can interpret the second alternative instruction as content equivalent to the second instruction pattern and execute the second alternative instruction; and a selection section which selects either processing to apply preprocessing to the intermediate code by the first preprocessing section and then execute the preprocessed intermediate code by the first interpreter in the first subsystem or processing to apply preprocessing to the intermediate code by the second preprocessing section and then execute the preprocessed intermediate code by the second interpreter in the second subsystem in accordance with the intermediate code to be executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a mapping diagram for illustrating association of an intermediate code and an alternative instruction by the intermediate code preprocessing apparatus according to the first embodiment of the present invention;

FIG. 4 is a view for illustrating each step in a process to apply the preprocessing to the intermediate code by the intermediate code preprocessing apparatus according to the first embodiment of the present invention;

DETAILED DESCRIPTION OF THE INVENTION

Preferred embodiments according to the present invention will now be described hereinafter with reference to the accompanying drawings.

[First Embodiment]

An intermediate code preprocessing apparatus according to the first embodiment of the present invention will be first described in detail with reference to FIGS. 1 to 4.

Figure 1:
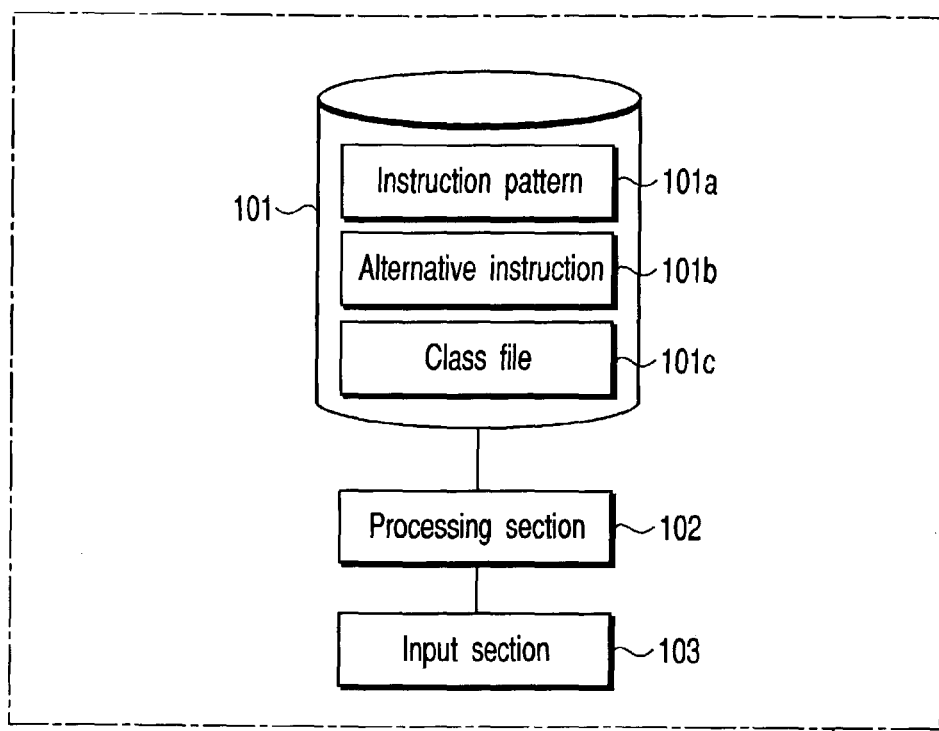
FIG. 1 is a block diagram showing the structure of an intermediate code preprocessing apparatus according to a first embodiment of the present invention.

FIG. 1 shows a hardware structure of an intermediate code preprocessing apparatus 1 according to the first embodiment which preprocesses the Java™ class file as intermediate code.

This intermediate code preprocessing apparatus 1 includes a storage section 101, a processing section 102 and an input section 103. The processing section 102 is an arithmetic operation device such as an PROCESSOR or a microcontroller. The number of the processing section 102 is not restricted to one, and it is possible to adopt a structure capable of distributed processing by a plurality of PROCESSORs or a plurality of kinds of arithmetic operation devices. The input section 103 inputs a class file or the like in the intermediate code preprocessing apparatus 1. The class file input from the input section 103 is stored in the storage section 101. The storage section 101 consists of a memory such as a RAM and/or a ROM. Here, only one storage section 101 is illustrated for convenience sake, but a plurality of storage sections may be distributed and arranged.

A table in which an instruction pattern 101a consisting of a plurality of instructions is associated with an alternative instruction 101b is stored in a predetermined area of the storage section 101, and a class file 101c is also stored in this section. Here, the instruction pattern 101a is a pattern consisting of a plurality of bytecode instructions.

For example, description will be given taking the addition of integers as an instance. In this case, an instruction pattern "iload", "iload", "iadd" may frequency appear in a method included in the Java™ class file as shown in FIG. 3, for example. Thus, the intermediate code preprocessing apparatus 1 according to the first embodiment stores in the storage section 101 a table in which the instruction pattern which frequency appears is associated with an alternative instruction, e.g., "v_v_iadd" which executes the similar processing as the instruction pattern. Here, "iload" is a mnemonic notation of an intermediate code consisting of two bytes which pushes a value of a local variable onto an operand stack. Further, "iadd" is a mnemonic notation of an intermediate code consisting of one byte which pops and adds two values from the operand stack and pushes a result are to the operand stack.

The alternative instruction 101b is an instruction which is interpreted as processing like the instruction pattern 101a in an environment where the alternative instruction 101b can be executed. On the contrary, this embodiment presumes existence of the intermediate code execution apparatus which can interpret the alternative instruction 101b as being substantially equivalent to the instruction pattern before substation and execute it. In the above case, for example, such an intermediate code execution apparatus interprets the alternative instruction "v_v_iadd" as processing like the instruction pattern "iload", "iload", "iadd" and executes it. Incidentally, when executing such an alternative instruction, it is desirable to minimize overhead factors in instruction execution by prevention of frequent access to memory, omission of redundant processing, exploitation of a register or the like.

Furthermore, the alternative instruction 101b has a code length shorter than that of the instruction pattern 101a. For example, the alternative instruction "v_v_iadd" has a code length of three bytes, which is shorter than the five bytes for the code length before substitution. Therefore, according to such preprocessing, the size of the class file 101c can be also reduced.

Figure 2:
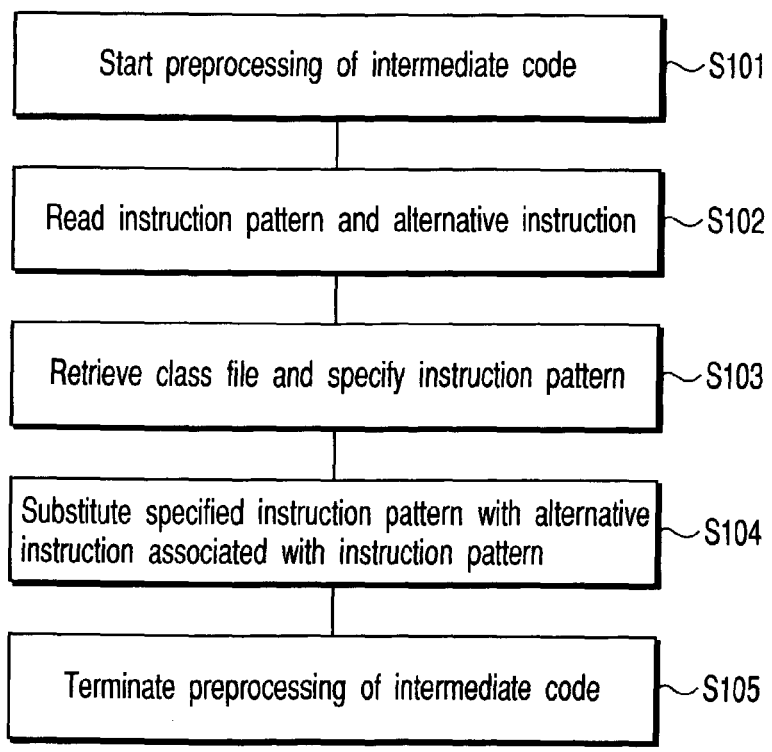
FIG. 2 is a flowchart for illustrating a process to apply preprocessing to intermediate code by the intermediate code preprocessing apparatus according to the first embodiment of the present invention.

In the above-described structure, each function of the intermediate code preprocessing apparatus 1 is realized by executing a series of software programs by the processing section 102, and the following preprocessing is applied to the class file 101c. FIG. 2 is a flowchart for illustrating procedures of the preprocessing in this embodiment. Here, it is presumed that the class file 101c is input to the intermediate code preprocessing apparatus 1 from the input section 103 and stored in the storage section 101. The processing is carried out by the following procedures on this presumption.

When the intermediate code preprocessing is started (S101), the processing section 102 first reads a table of the instruction pattern 101a and the alternative instruction 101b associated with each other from the storage section 101 (S102).

Then, the processing section 102 retrieves the class file 101c and specifies the instruction pattern 101a (S103). That is, for example, as shown in FIGS. 3 and 4, a serial instruction pattern 101a "iload", "iload", "iadd" is specified in the class file 101c.

Upon specifying the instruction pattern in this manner, the processing section 102 substitutes the specified instruction pattern 101a in the class file 101c with the alternative instruction 101b associated with the instruction pattern 101a (S104).

FIG. 4 is a view concretely illustrating an example of the processing at S104. In this example, "iload 8", "iload 9", "iadd" included in the specified instruction pattern are first converted into "nop", "nop", "v_v_iadd 8, 9" (first stage). Here, "nop" is an instruction which executes nothing.

A plurality of "nop" instructions are inserted before "v_v_iadd 8, 9" in this manner in order to avoid a change in size of the class file to be converted and prevent a change in destination to which the condition included in the class file jumps. After applying the processing at the first stage, processing to delete each "nop" is performed while changing a destination to which the condition jumps (second stage). As a result, processing at S104 is completed.

In this manner, the preprocessing of the intermediate code is terminated (S105).

In the intermediate code preprocessing apparatus according to the first embodiment, the length of the code to be executed is reduced from a total of five bytecodes "iload", "iload", "iadd" to one three-byte instruction "v_v_iadd". Therefore, the redundant processing between instructions can be omitted while reducing the number of instructions to be executed, and the size of the class file can be decreased.

The thus obtained intermediate code can be executed at a high speed in the execution environment according to such an alternative instruction as "v_v_iadd" by interpreting the alternative instruction 101b as processing which is equivalent to the instruction pattern 101a before substitution and has overhead factors such as memory access minimized and executing it. Moreover, since the above-described preprocessing of the intermediate code is simply substitution of the code, it can be executed with low overhead, and the size of the class file can not be increased as with the case of compiling into native code. Therefore, the performance of execution of the intermediate code can be significantly improved.

For example, when applying this embodiment to an embedded device such as a mobile phone, an execution environment in which the above-described alternative instruction 101b can be executed may be mounted in the embedded device, and the preprocessed class file may be preinstalled in or distributed to the embedded device by the intermediate code preprocessing apparatus 1. By doing so, the performance of the Java™ application executed on the embedded device can be improved. In addition, the preprocessing apparatus 1 and the execution environment in which the alternative instruction 101b can be executed may be mounted in the embedded device, and both the preprocessing of the class file and execution of the preprocessed class file may be executed on the mobile phone.

It is to be noted that the table having the instruction pattern 101a and the alternative instruction 101b associated with each other is stored in the storage section 101 in this embodiment but such a table may be embedded in the software program to execute the preprocessing or it may be provided independently from the software program to execute the preprocessing.

Further, in the above-described procedures of the preprocessing, the processing at S104 is not restricted to that shown in FIG. 4. For example, after the processing at the first stage shown in FIG. 4, "nop" does not have to be deleted without performing the processing at the second stage. In this case, the intermediate code including "nop" may be executed as it is in the execution environment, or the class file may be executed while performing deletion of "nop" and change of a destination to which the condition jumps in the execution environment. In the latter case, in particular, it is preferable to carry out the above-described preprocessing by utilizing the idle time by the execution environment.

[Second Embodiment]

The intermediate code execution apparatus according to a second embodiment of the present invention will now be described with reference to FIGS. 5 and 6.

Figure 5:
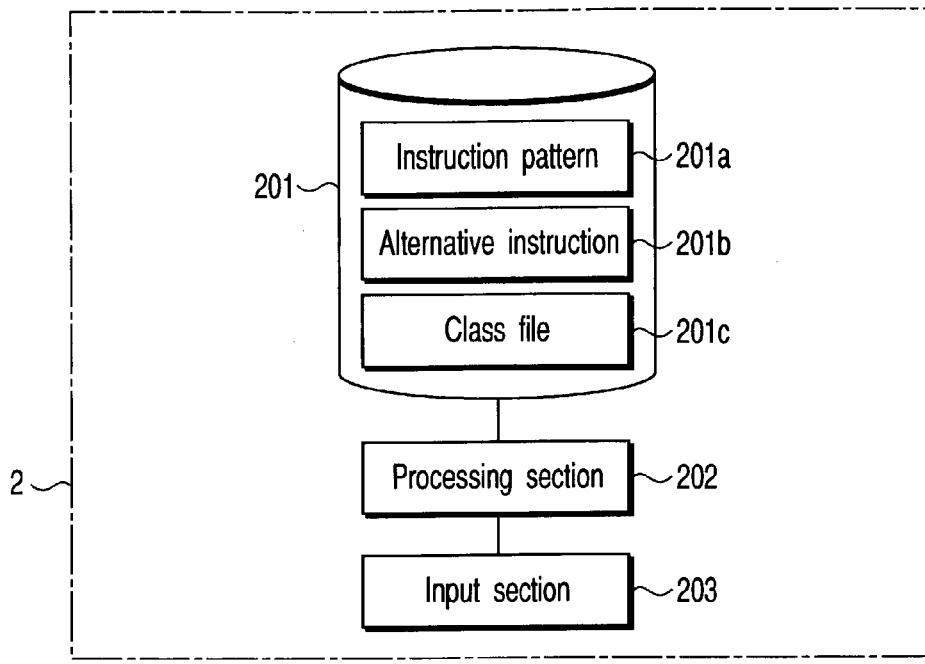
FIG. 5 is a block diagram showing the structure of an intermediate code execution apparatus according to a second embodiment of the present invention.
Figure 6:
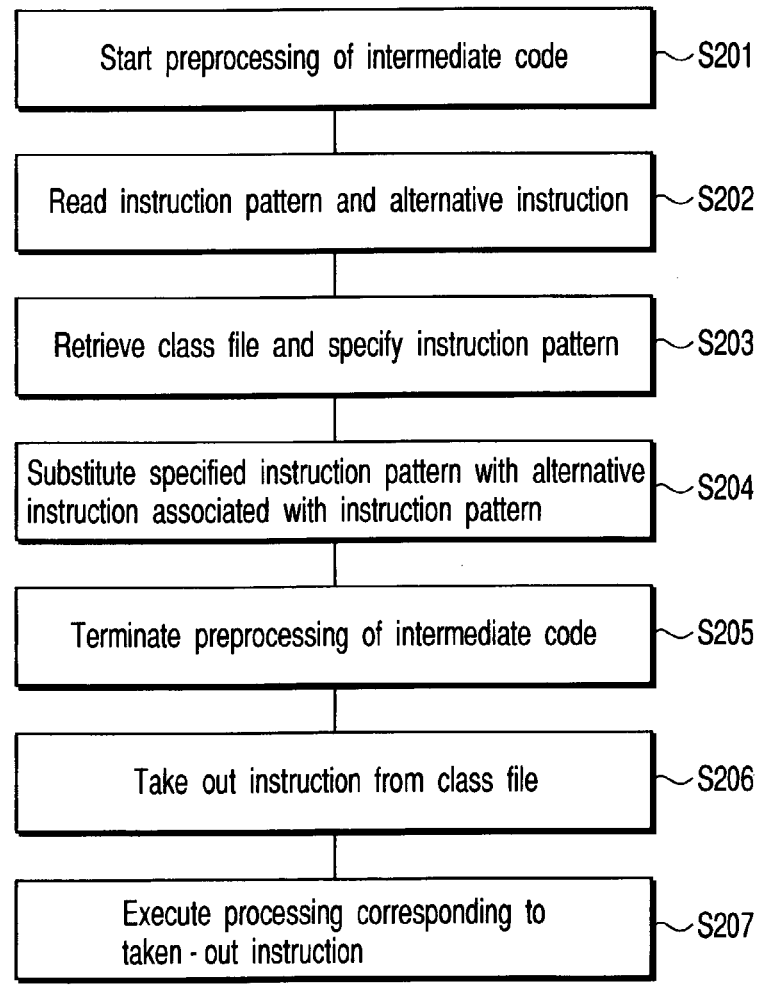
FIG. 6 is a flowchart for illustrating processing by the intermediate code execution apparatus according to the second embodiment of the present invention.

FIG. 5 shows a hardware structure of an intermediate code execution apparatus 2 according to the second embodiment of the present invention which executes the Java™ class file as intermediate code. The intermediate code execution apparatus 2 includes a storage section 201, a processing section 202, and an input section 203. It is to be noted that the storage section 201, the processing section 202 and the input section 203 are substantially similar to the storage section 101, the processing section 102 and the input section 103 of the intermediate code preprocessing apparatus 1 according to the first embodiment. Furthermore, an instruction pattern 201a, an alternative instruction 201b and a class file 201c stored in the storage section 201 are substantially similar to the instruction pattern 101a, the alternative instruction 101b and the class file 101c stored in the storage section 101 of the intermediate code preprocessing apparatus 1 according to the first embodiment. Therefore, repeated explanation about these members are omitted here.

In the above-described structure, each function of the intermediate code execution apparatus 2 is realized by executing a series of software programs by the processing section 202, preprocessing is applied to the class file 201c as mentioned below, and the preprocessed class file 201c is executed. FIG. 6 is a flowchart for illustrating procedures of preprocessing and execution of the class file 201c in this embodiment. The procedures are based on the presumption that the class file 201c previously input from the input section 203 is stored in the storage section 201.

Preprocessing of the intermediate code is first started (S201), and the processing section 202 reads a table of the instruction pattern 201a and the alternative instruction 201b associated with each other from the storage section 201 (S202). Subsequently, the processing section 202 retrieves the class file 201c and specifies the instruction pattern 201a (S203). Then, the processing section 202 substitutes the specified instruction pattern 201a with the alternative instruction 201b (S204), and the preprocessing of the intermediate code is completed (S205). The processing mentioned above is the same procedures as those of the preprocessing in the first embodiment, thereby omitting the detailed description.

Then, the class file 201c subjected to preprocessing as mentioned above is executed. Here, there is executed the software program forming the interpreter which can interpret the alternative instruction 201b as a content equivalent to the instruction pattern 201a and execute it, the processing section 202 thereby takes out an instruction from the class file 201c stored in the storage section (S206), and processing corresponding to the taken-out instruction is executed by the processing section 202 (S207).

According to the intermediate code execution apparatus 2 according to the second embodiment, the preprocessing to substitute the instruction pattern 201a with the alternative instruction 201b can be applied to the class file 201c by the above-described procedures, thereby executing the preprocessed intermediate code. Therefore, the code length of the class file 201c can be reduced, and the intermediate code in which redundant processing between instructions is omitted can be executed, thereby improving the performing in execution of the intermediate code. Moreover, when executing the preprocessed intermediate code, the performance in execution of the intermediate code can be further improved by interpreting the alternative instruction as processing with the overhead factors being minimized and executing it.

It is to be noted that description has been given as to the case where the preprocessing and execution of the class file are continuously carried out in the procedures shown in FIG. 6, but the preprocessing and execution of the class file do not have to be continuously performed, and the preprocessing may be applied to the class file in advance and then the preprocessed class file may be executed later.

In addition, the instruction pattern 201a associated with the alternative instruction 201b is not restricted to one type, and the number of types of the instruction pattern 201a may be two or more. In such a case, when continuously performing the preprocessing and execution of the class file in the procedures shown in FIG. 6, only some of the instruction patterns 201a associated with the alternative instruction 201b may be subjected to the preprocessing to substitute with the alternative instruction in order to start execution of the class file with the overheads of the preprocessing being reduced as much as possible.

Additionally, the performances of the PROCESSOR or the microcontroller forming the processing section 202 varies depending on each device in which the intermediate code execution device 2 is mounted, and an additional time or a throughput of the device system required for preprocessing also varies depending on situations. Therefore, when there are a plurality of instruction patterns associated with the alternative instruction, the amount of the instruction patterns to be substituted may be statically adjusted in accordance with characteristics of the device or situations. In this manner, the preprocessing according to the characteristics of the device in which the intermediate code execution apparatus 2 is mounted or situations can be realized. For example, when the intermediate code execution apparatus 2 according to the present invention is mounted in a mobile phone, only some of the instruction patterns may be adjusted to be substituted when the class file downloaded to the mobile phone is immediately executed, or all the instruction patterns may be adjusted to be substituted when it is not immediately executed. By doing so, the class file can be executed while applying the preprocessing on the mobile phone according to the situations.

[Third Embodiment]

An intermediate code execution apparatus according to a third embodiment of the present invention will now be described in detail with reference to FIGS. 7 to 9.

Figures 7, 8:
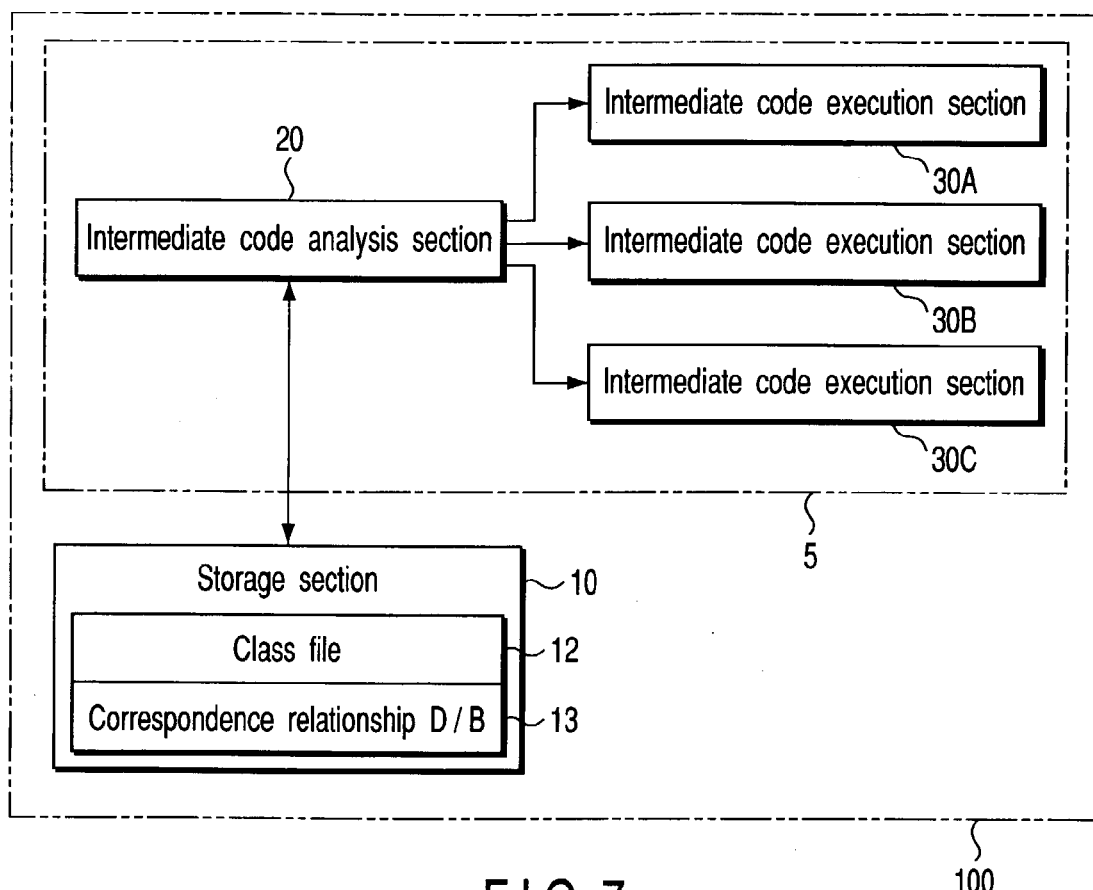
FIG. 7 is a block diagram showing the structure of an intermediate code execution apparatus according to a third embodiment of the present invention.
FIG. 8 is a data structural view of a correspondence relationship data base 13 adopted by the intermediate code execution apparatus according to the third embodiment of the present invention.

FIG. 7 is a view schematically showing an intermediate code execution apparatus 100 according to the third embodiment of the present invention which executes the Java™ class file as intermediate code. This intermediate code execution apparatus 100 has an arithmetic operation section 5 including an PROCESSOR or a microcontroller and a storage section 10 connected to the arithmetic operation section 5.

The arithmetic operation section 5 constitutes an intermediate code analysis section 20 and intermediate code execution sections 30A, 30B and 30C by executing a predetermined software program. Such a software program may be stored in the storage section 10, or it may be stored in another storage section.

Each of the intermediate code execution sections 30A, 30B and 30C functions as an interpreter which sequentially interprets and executes the intermediate code. Additionally, the intermediate code execution sections 30A, 30B and 30 are of types with processing characteristics different from each other. For example, the intermediate code execution section 30A processes a bytecode instruction F at high speed but processes a bytecode instruction G at low speed. The intermediate code execution section B processes the bytecode instruction G at high speed but processes a bytecode instruction F at low speed. The intermediate code execution section C has an average processing speed with respect to any bytecode instructions.

The intermediate code analysis section 20 analyzes the nature of a method included in the class file 12 stored in the storage section 10, selects the intermediate code execution section 30 according to the nature, and records a combination of the method and the selected intermediate code execution section 30. Processing carried out by the intermediate code analysis section 20 will be described later.

The storage section 10 has a RAM, a ROM and others, and stores the class file 12 and a correspondence relationship data base 13. The storage section 10 may have a physically single structure, or a plurality of storage sections 10 may be provided.

The class file 12 is generated by compiling a source code file created in the Java™ language, and includes one or more methods. This method is a set of a plurality of bytecode instructions in order to realize specific processing.

The correspondence relationship data base 13 is a data base which manages a score of a processing efficiency degree of each bytecode instruction in each of the intermediate code execution sections 30A, 30B and 30C. FIG. 8 is a data structural view showing an example of a concrete content of the correspondence relationship data base 13. As shown in FIG. 8, the correspondence relationship data base 13 stores a score of the processing efficiency degree of each bytecode instruction in each of the intermediate code execution sections 30A, 30B and 30C. Here, the score of the processing efficiency degree is a value showing a level at which the bytecode instruction can be efficiently executed, and it is preferable to previously define such a score in accordance with specifications of the respective intermediate code execution sections 30A, 30B and 30C.

For example, at the uppermost stage in FIG. 8, the score of the processing efficiency degree of a bytecode instruction a in each of the intermediate code execution section 30A, 30B and 30C is defined. In more detail, the score of the processing efficiency degree of the bytecode instruction a in the intermediate code execution section 30A is defined as 90; the score of the processing efficiency degree in the intermediate code execution section 30B, 10; and the score of the processing efficiency degree in the intermediate code execution section 30C, 10 (here, it is determined that the efficiency is better when the value is higher). Therefore, according to such a correspondence relationship data base 13, it can be found that it is most efficient to execute the bytecode instruction a by the intermediate code execution section 30A. Similarly, scores of the processing efficiency degrees of bytecode instructions b and c and all of other bytecode instructions in each of the intermediate code execution sections 30A, 30B and 30C are defined in the correspondence relationship data base 13.

The procedures of processing executed by the intermediate code analysis section 20 of the intermediate code execution apparatus 100 according to the third embodiment will now be described with reference to a flowchart of FIG. 9.

The intermediate code analysis section 20 first reads a method from the class file 12 of the storage section 10 (S301). Then, the intermediate code analysis section 20 analyzes the read method and specifies the bytecode instruction included in the method (S302). Since one method includes a plurality of bytecode instructions, the intermediate code analysis section 20 repeats the procedures to specify each of a plurality of the bytecode instructions included in the method.

Then, the intermediate code analysis section 20 inquires the correspondence relationship data base 13 in the storage section 10, acquires the scores of the processing efficiency degree corresponding to the respective bytecode instructions specified at S102, and calculates a sum of these scores (S303).

Thereafter, the intermediate code analysis section 20 specifies the intermediate code execution section which can most efficiently execute the class file 12 based on the total score of the processing efficiency degree in the respective intermediate code execution sections 30A, 30B and 30C obtained at S303 (S304). Specifically, the total scores may be compared with each other in accordance with each intermediate code execution section by the intermediate code analysis section 20, and the intermediate code execution section with the highest total score may be specified as the intermediate code execution section used to execute the method.

At last, the intermediate code analysis section 20 records that the method should be executed by the intermediate code execution section specified at S304 (S305). Specifically, for example, a type of the intermediate code execution section which should perform execution may be recorded in management information held in accordance with each method, or a type of the intermediate code execution section which should perform execution may be marked in the method. This operation is executed with respect to all the methods included in the class file 12, and the intermediate code analysis section 20 terminates the processing.

The contents of the processing at S303 and S304 will now be concretely described taking the correspondence relationship data base 13 shown in FIG. 8 as an example. Assuming that the bytecode instructions a and d are included in the method, the intermediate code analysis section 20 acquires 90 which is the score of the processing efficiency degree of the byte doe instruction a in the intermediate code execution section 30A, 10 which is the score of the processing efficiency degree in the intermediate code execution section 30B, and 10 which is the score of the processing efficiency degree in the intermediate code execution section 30C. Then, the intermediate code analysis section 20 acquires 50 which is the processing efficiency degree of the bytecode instruction d in the intermediate code execution section 30A, 40 which is the score of the processing efficiency degree in the intermediate code execution section 30B, and 90 which is the score of the processing efficiency degree in the intermediate code execution section 30C, and adds them to the scores of the bytecode instruction a.

In this case, the total score of the processing efficiency degree in the intermediate code execution section 30A is 140; the total score in the intermediate code execution section 30B, 50; and the total score in the intermediate code execution section 30C, 100. Therefore, the intermediate code analysis section 20 specifies the intermediate code execution section 30A which is to be utilized to execute the method.

By performing the above-described processing, the intermediate code execution apparatus 100 can use the most efficient intermediate code execution section 30A, 30B or 30C determined in accordance with the bytecode instruction included in the method based on the content recorded by the intermediate code analysis section 20 when executing the method included in the class file 12.

Thus, according to the third embodiment, since the method included in the class file 12 can be efficiently executed by exploiting the intermediate code execution sections 30A, 30B and 30C having the different characteristics, thereby providing the intermediate code execution apparatus 100 with the high performance.

[Fourth Embodiment]

An intermediate code execution apparatus according to a fourth embodiment of the present invention will now be described in detail with reference to FIGS. 10 and 11.

The intermediate code execution apparatus according to the fourth embodiment has the same basic structure as the third embodiment. However, the intermediate code execution apparatus according to the fourth embodiment is different from the third embodiment in that the intermediate code analysis section 20 calculates a sum of scores uniquely determined with respect to respective bytecode instructions included in a method and specifies any one of the intermediate code execution section 30A, 30B and 30C in accordance with the rank of that sum.

Figures 9, 10, 11:
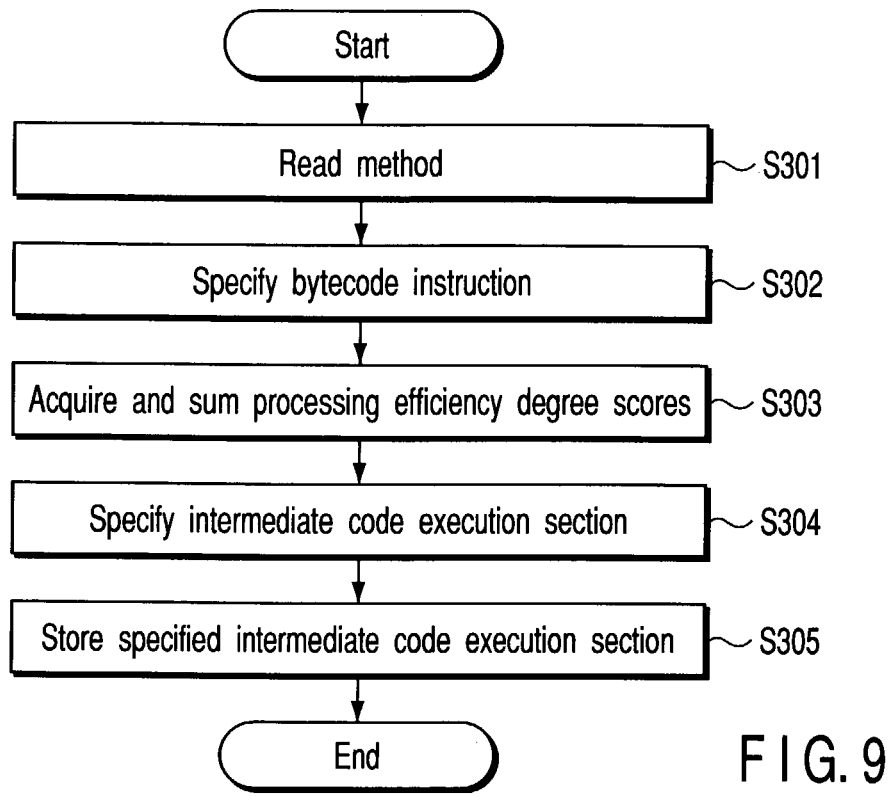
FIG. 9 is a flowchart showing the operation by an intermediate code analysis section 20 in the intermediate code execution apparatus according to a third embodiment of the present invention.
FIG. 10 is a data structural view of a correspondence relationship data base 13 adopted by an intermediate code execution apparatus according to a fourth embodiment of the present invention.
FIG. 11 is a data structural view of the correspondence relationship data base 13 adopted by the intermediate code execution apparatus according to the fourth embodiment of the present invention.

In the intermediate code analysis section 20, in order to realize the above-described specification method, the correspondence relationship data base 13 in the fourth embodiment includes a table which defines the correspondence relationship between respective bytecode instructions and scores of the respective bytecode instructions such as shown in FIG. 10, and a table which defines the correspondence relationship between a range of a total score and the intermediate code execution sections 30A, 30B and 30C such as shown in FIG. 11.

Giving description on the former based on the example of FIG. 10, the left side in FIG. 10 shows the respective bytecode instructions, and the right side in FIG. 10 shows values of the scores set in accordance with these instructions. Here, the score of bytecode instruction a is uniquely set to 40; the score of bytecode instruction b, 90; and the score of bytecode instruction c, 50.

Further, giving description on the latter based on the example of FIG. 11, the left side in FIG. 11 shows a range of the total score, and the right side in FIG. 11 shows any of the intermediate code execution sections 30A, 30B and 30C specified in accordance with a range of the total score. Here, when the total score corresponding to the bytecode instruction included in a given method falls in a range of less than 201, the intermediate code execution section 30A is specified. Similarly, when the sum of scores is not less than 201 but less than 401, the intermediate code execution section 30B is specified. When it is not less than 401, the intermediate code execution section 30C is specified.

In the fourth embodiment, the basic procedures of the processing executed by the intermediate code analysis section 20 are substantially equal to those in the third embodiment.

That is, as shown in FIG. 7, the intermediate code analysis section 20 reads a method from the class file 12 in the storage section 10 (S101), specifies the bytecode instructions included in the method (S102), acquires scores corresponding to the respective specified bytecode instruction by inquiring the correspondence relationship data base 13 and calculates a sum of these scores (S103). Thereafter, the intermediate code execution section according to the total score is specified by again inquiring the correspondence relationship data base 13 (S104), record that the method should be executed in the specified intermediate code execution section (S105), and terminates the processing.

The contents of the processing at S103 and S104 will now be concretely described taking the correspondence relationship data base 13 shown in FIGS. 10 and 11 as an example.

Assuming that bytecode instructions a and c are included in the method, the intermediate code analysis section 20 acquires 40 which is the score of the bytecode instruction a and 55 which is the score of the bytecode instruction c, and a sum of these scores is 95 (ST103). The intermediate code analysis section 20 specifies the intermediate code execution section 30A which is to be utilized to execute the method based on the sum and the table shown in FIG. 11.

In the fourth embodiment which performs the above-described processing, the most efficient intermediate code execution section 30A, 30B or 30C determined in accordance with the bytecode instruction included in the method can be used like the third embodiment, thereby providing the intermediate code execution apparatus 100 with the very high performance.

[Fifth Embodiment]

An intermediate code execution apparatus according to a fifth embodiment of the present invention will now be described in detail with reference to FIGS. 12 and 13.

Figure 12:
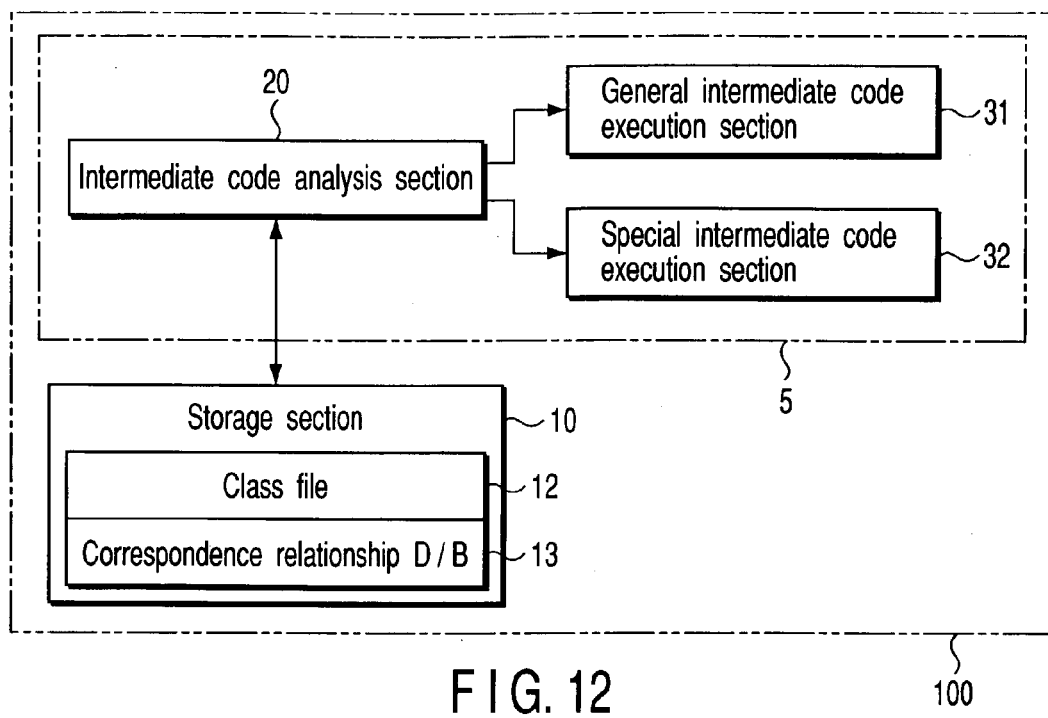
FIG. 12 is a block diagram showing the structure of an intermediate code execution apparatus according to a fifth embodiment of the present invention.
Figure 13:
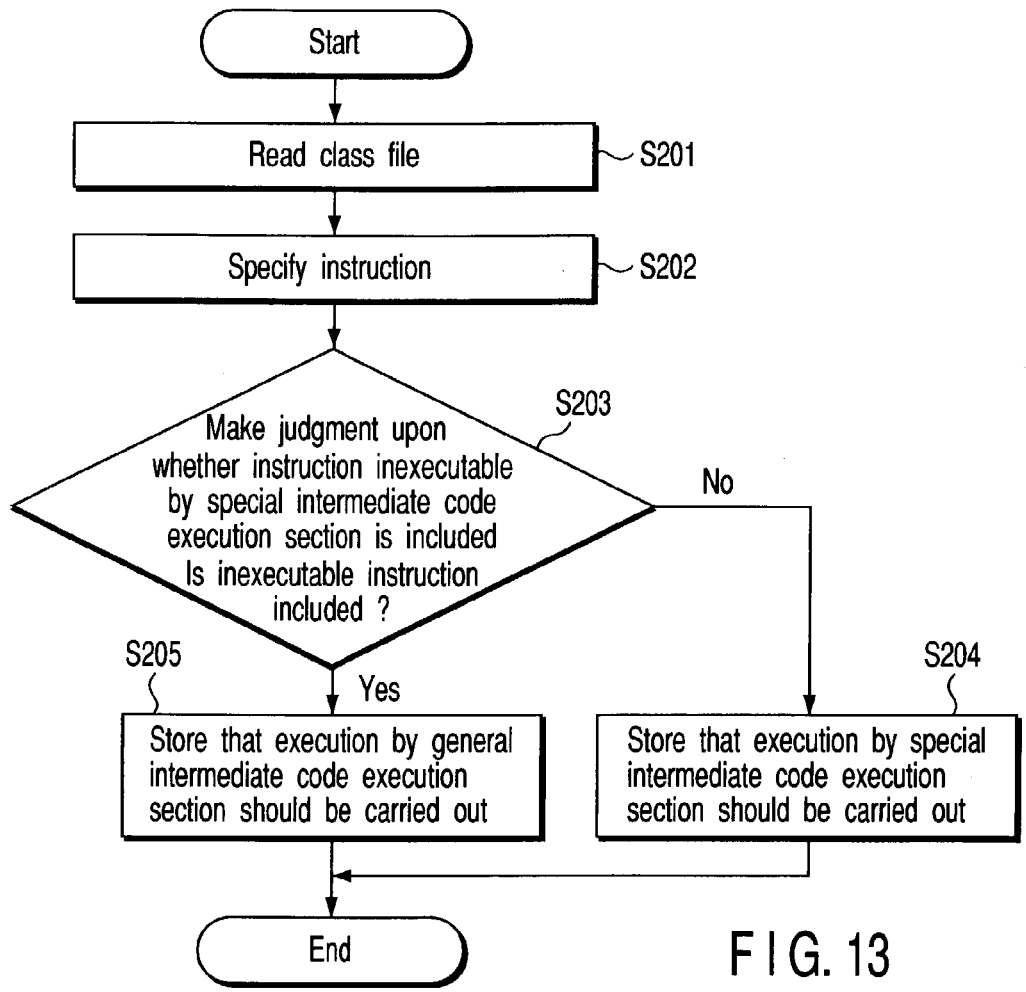
FIG. 13 is a flowchart showing the operation by an intermediate code analysis section 20 adopted by the intermediate code execution apparatus according to the fifth embodiment of the present invention.

FIG. 12 is a view schematically showing an intermediate code execution apparatus 200 according to the fifth embodiment of the present invention. This intermediate code execution apparatus 200 is equivalent to the third and fourth embodiments in the basic structure but different from the third and fourth embodiments in that a general intermediate code execution section 31 and a special intermediate code execution section 32 are provided.

This intermediate code execution apparatus executes the class file 12 by using the general intermediate code execution section 31 and the special intermediate code execution section 32. The general intermediate code execution section 31 is an interpreter which sequentially interprets and executes class files and has a regular function to execute all the bytecode instructions. On the other hand, the special intermediate code execution section 32 is a special interpreter which can execute specific bytecode instructions at a higher speed than that of the general intermediate code execution section 321 but cannot execute some of the instructions (for example, a bytecode instruction concerning floating-point arithmetic operation).

Furthermore, a correspondence relationship data base 13 in the fifth embodiment has a data structure used to identify whether each of the bytecode instructions can be executed by the special intermediate code execution section 32.

Procedures of the processing executed by the intermediate code analysis section 20 of the intermediate code execution apparatus 200 according to the fifth embodiment will now be described with reference to a flowchart of FIG. 13.

The intermediate code analysis section 20 first reads a method from the class file 12 of the storage section 10 (S201). Then, the intermediate code analysis section 20 analyzes the read method, specifies the bytecode instructions included in the method (S202), and makes judgment upon whether the specified bytecode instructions can not be executed by the special intermediate code execution section 32 based on the content of the correspondence relationship data base 13 (S203).

At S203, when it is determined that the bytecode instructions which are inexecutable by the special intermediate code execution section 32 are not included, the intermediate code analysis section 20 records that the method should be executed by the special intermediate code execution section 32 (S204). On the other hand, when it is determined that the bytecode instructions which are inexecutable by the special intermediate code execution section 32 are included at S203, the intermediate code analysis section 20 records that the method should be executed by the general intermediate code execution section 31 (S205). It is to be noted that the recording method may be similar to those in the third and fourth embodiments. The above-described operation is executed with respect to all the methods included in the class file 12, and the intermediate code analysis section 20 terminates the processing.

According to the fifth embodiment mentioned above, specific bytecode instructions can be executed at a high speed by separately using the special intermediate code execution section 32 which can execute the specific bytecode instructions at a high speed but can not execute some of the bytecode instructions and the general intermediate code execution section 31 which can execute all the instructions, and the intermediate code execution apparatus 200 which can execute all the bytecode instructions can be provided.

Sixth Embodiment

Figure 14:
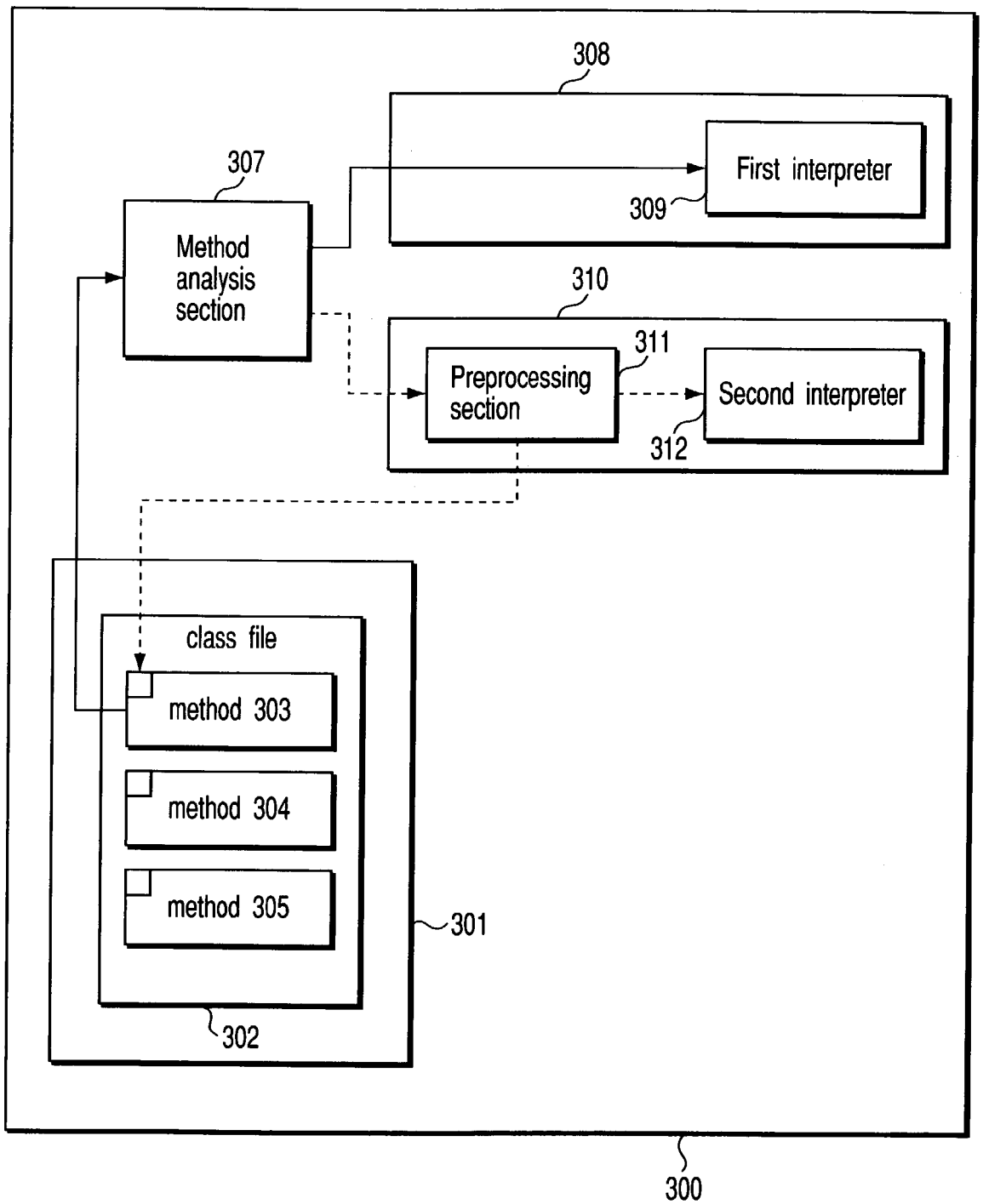
FIG. 14 is a block diagram showing the structure of an intermediate code execution apparatus according to a sixth embodiment of the present invention.

An intermediate code execution system according to a sixth embodiment of the present invention will now be described in detail with reference to FIG. 14.

The intermediate code execution system 300 according to the sixth embodiment executes a class file of Java™ as an intermediate code. Moreover, as shown in FIG. 14, the intermediate code execution system 300 is mainly constituted by a storage section 301 which stores a class file 302, a method analysis section 307 which is virtually configured by executing a predetermined program by a non-illustrated processing section, a first subsystem 308 and a second subsystem 310.

The class file 302 stored in the storage section 301 can be obtained by compiling a source code created in Java™ language. This class file 302 includes methods 303 to 305.

The class file 302 is distributed as a compressed jar file, and it may be decompressed by the intermediate code execution system 300. It is to be noted that the jar file is an archive file in which class files required for operating the Java™ program are organized as one. In FIG. 14, however, it has been already stored in the storage section 301 in the form of the class file.

The first subsystem 308 has a first interpreter 309. In addition, it can sequentially interpret and execute bytecode instructions included in the class file of Java™ by using the first interpreter 309. The first interpreter 309 is a regular interpreter which is compatible with an instruction code set generated in compile, i.e., all bytecode instructions generated by compiling source codes created in Java™ language in this example.

On the other hand, the second subsystem 310 has a preprocessing section 311 having a structure and a function substantially equal to those of the above-described intermediate code preprocessing apparatus, and a second interpreter 312. The preprocessing section 311 applies to each method in the class file 302 the processing to substitute a specific bytecode instruction pattern with a corresponding alternative instruction, for example, substitute an instruction pattern "iload", "iload", "iadd" with "v_v_iadd". In addition, the second interpreter 312 is configured so as to be capable of interpreting and executing the alternative instruction added to the method after substitution in order to cope with the processed method.

More concretely, substituting a specific instruction pattern with an alternative instruction in the preprocessing section 311 means substituting a combination of an operation code and an operand forming the specific instruction pattern with a set of an operation code and an operand of a newly defined alternative instruction. It is to be noted that the operation code represents the operation of an instruction and the operand represents a stack, a register or the like which is the target of the instruction.

In case of Java™, however, since the length of the operation code is restricted to one byte, the types of operation codes cannot be freely increased.

Thus, in the sixth embodiment, an alternative instruction is allocated to the operation code to which another instruction has been already allotted, the operation code is interpreted as the alternative instruction in execution, and the same procedures as those performed for the instruction pattern before substitution are carried out.

That is, in the sixth embodiment, an alternative instruction is allocated to the operation code to which a floating-point arithmetic operation instruction has been allotted in a regular bytecode instruction. Then, in the second interpreter 312, the operation code is interpreted and executed in accordance with the same procedures as those for the instruction pattern before substation with the alternative instruction.

By doing so, in the second subsystem 310, the method is preprocessed in the preprocessing section 311, and then it can be executed by the second interpreter 312. In the above-described example, however, the method including the floating-point arithmetic operation instruction can not be executed by the second subsystem 310.

The above-described method analysis section 307 analyzes the instruction included in the method to be executed, and selects either the first subsystem 308 or the second subsystem 310 by which the method is executed in accordance with a result of analysis. Then, a result of selection is marked in the method. That is, the function of the method analysis section 307 in the sixth embodiment corresponds to the function of the intermediate code analysis section 20 in the fifth embodiment.

Description will now be given as to procedures to execute the method 303 included in the class file 312 by the intermediate code execution system 300 having the above-described structure.

The instructions included in the method 303 are first analyzed by the method analysis section 307.

For example, when the operation code of the alternative instruction is allocated to the operation code of the floating-point arithmetic operation instruction in the second subsystem 310 as described above, judgment is made upon whether the method 303 includes an instruction of the floating-point arithmetic operation. Then, the subsystem which should use the method 303 is marked at a predetermined position 306 of the method 303 based on a result of judgment. That is, when it is determined that the method 303 includes an instruction of the floating-point arithmetic operation, execution in the first subsystem 309 is selected. Also, when it is determined that the method 303 does not include the instruction of the floating-point arithmetic operation, execution in the second subsystem 310 is selected.

When execution in the first sub system 309 is selected, the method 303 is sequentially interpreted and executed as it is by the first interpreter 309.

On the other hand, when execution in the second subsystem 310 is selected, the preprocessing section 311 applies the preprocessing to the method 303, and a fixed pattern formed by a plurality of instructions included in the method 303 is substituted with an alternative instruction. Then, the alternative instruction is sequentially interpreted and executed by the second interpreter 312 according to the alternative instruction.

Then, upon completion of execution of the method 303 as described above, sequential execution of any of the methods 303 to 305 is continued until end of the program in accordance with the content of the class file 302.

According to the structure and the procedures of method execution of the intermediate code execution system 300 according to the sixth embodiment, it is possible to effectively operate the second subsystem 310 which can not execute some of the instructions but can execute the method at a high speed with redundant processing between instructions being omitted by substituting the specific instruction pattern included in the method with the alternative instruction and executing it and the first subsystem 308 which can execute all the instructions, thereby executing the class file with the excellent performance.

It is to be noted that the first to sixth embodiments can be modified in many ways.

For example, in the first and second embodiments, description has been given as to the case where the preprocessing is applied in units of class file, but the preprocessing may be applied in units of method in these embodiments like the sixth embodiment. Further, the data structure in the correspondence relationship data base 13 in the third and fourth embodiments or setting of scores in such a structure is not restricted that described above.

Furthermore, in place of a combination of the first subsystem 309 and the second subsystem in the sixth embodiment, it is possible to employ two subsystems each having the preprocessing section which substitutes the specific instruction pattern with the alternative instruction and the interpreter which can execute the alternative instruction. In the case of using a combination of such subsystems, both subsystems can be separately used by allocating the alternative instructions to different operation codes in both subsystems. The number of the subsystems may be three or more.

Moreover, in the sixth embodiment, although description has been given as to the case where the preprocessing is applied during execution of the method in the second subsystem 310, the preprocessing of the method which has been once executed may be omitted by holding the preprocessed method in the storage section 301. In addition, all methods may be analyzed by the method analysis section 307 when loading the class, and the method which should be executed in the second subsystem 310 may be preprocessed in advance. Additionally, the preprocessing may be applied at the time of compile.

Further, in the situation that the memory consumption, overheads or the like due to analysis by the method analysis section 307 or the preprocessing by the preprocessing section 311 can not be allowed, such analysis or processing may be omitted and the method may be executed in the first subsystem 308.

Furthermore, in the sixth embodiment, although description has been given as to the case where the alternative instruction is allocated to the operation code to which the instruction of the floating-point arithmetic operation has been allotted as an example, the present invention is not restricted thereto. The alternative instruction may be allocated to the operation code to which any other instruction has been allotted.

Furthermore, in each of the first to sixth embodiments, the class file of Java™ can be applied to the modified intermediate code, and even any language other than Java™ can be applied as long as execution of the intermediate code between the source code and the native code is assumed.

The above has described the first to sixth embodiments according to the present invention.

That is, according to the first and second embodiments, a predetermined instruction pattern is specified, and the specified instruction pattern is substituted with an alternative instruction which is a reduced code. Therefore, types of the instructions can be decreased, and a new intermediate code with redundant processing between instructions being omitted can be obtained. Moreover, the size of the intermediate code can not be increased in this preprocessing. In addition, since the preprocessing itself just performs simple substitution, high-speed execution is possible. Additionally, the intermediate code can be executed at a high speed by executing the newly obtained intermediate code in the execution system corresponding to the alternative instruction.

Further, according to the third embodiment, a plurality of intermediate code execution sections are provided in the apparatus and, on the other hand, the intermediate code execution section appropriate for efficient execution of the intermediate code is selected and recorded by analyzing the intermediate code as an execution target by the intermediate code analysis section. Therefore, the intermediate code can be executed at a high speed by selecting the recorded intermediate code execution section. Furthermore, the correspondence relationship between each bytecode instruction included in the intermediate code and the score of the processing efficiency degree in each intermediate code executing means is stored, and the intermediate code execution section used for execution of the intermediate code is specified based on this relationship. Thus, it is possible to judge the intermediate code execution section appropriate for efficient execution of the bytecode instruction based on the detailed setting taking the nature of each intermediate code execution section into consideration.

Moreover, according to the fourth embodiment, the correspondence relationship between each bytecode instruction included in the intermediate code and the score of the processing efficiency degree in the intermediate code execution section and the correspondence relationship between a range of the score and the intermediate code execution section specified in accordance with this range are stored, and the intermediate code execution section utilized to execute the intermediate code is specified based on these relationships. Therefore, even if the number of prepared intermediate code execution sections is large, it is possible to obtain merits that the score of the processing efficiency degree in accordance with each intermediate code execution section does not have to be set and integrated.

In addition, according to the fifth embodiment, there are provided two types of intermediate code execution sections, i.e., the special intermediate code execution section and the general intermediate code execution section, and the general intermediate code execution section executes only the intermediate code including the bytecode instructions which cannot be executed by the special intermediate code execution section and, on the other hand, the special intermediate code execution section executes any other intermediate code. Therefore, in cases of alternatively selecting a destination to which the intermediate code is output between the intermediate code execution section specialized for specific processing and the intermediate code execution section which can be generally utilized, the system which realizes execution of the intermediate code at very high speed can be provided.

Additionally, according to the sixth embodiment, although there are effectively operated the second subsystem which cannot execute some of the instructions but can omit the redundant processing between instructions and execute the method at high speed by substituting the specific instruction pattern included in the method with the alternative instruction and executing it and the first subsystem whose speed of method execution is not high but which can execute all the instructions, thereby executing the class file with the excellent performance.

It is to be noted that the present invention is not restricted to the first to sixth embodiments mentioned above, and various improvements/modifications can be made within a scope of the invention. For example, in the third to fifth embodiments, there is adopted the structure previously storing the correspondence relationship between the bytecode instruction included in the intermediate code and the intermediate code execution section appropriate for efficient execution of the bytecode instruction. However, the present invention is not restricted thereto, and it may be configured to change the correspondence relationship in accordance with situations. Further, the execution speed can be improved by realizing at least a part of the interpreter function by a hardware accelerator. Adopting the hardware accelerator has various advantages, for example, prevention of increase in the required memory quantity, employment of a method suitable for an embedded device and others.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An intermediate code execution apparatus which executes intermediate code obtained by compiling source code created in a predetermined program language, comprising:

a plurality of intermediate code execution sections which execute the intermediate code; a storage section which stores intermediate code and also stores a correspondence relationship between an instruction included in the intermediate code and appropriateness of each said intermediate code execution sections for efficient execution of said instruction; and an intermediate code interpretation section which executes the following processing:

a) identification of the instructions included in the intermediate code stored in said storage section;

b) determination of an appropriate one from said intermediate code execution sections for efficient execution of the intermediate code based on said identified instructions and said correspondence relationship; and c) recording of a relationship between the intermediate code and said appropriate intermediate code execution section for the intermediate code execution, wherein said correspondence relationship includes a score table of a processing efficiency degree when each instruction is executed by each of said intermediate code execution sections, and b) further includes the following processing:

b1) acquisition of a score of the processing efficiency degree when said identified instruction is executed by each of said intermediate code execution sections based on said score table;

b2) calculation of a sum of the acquired scores in accordance with each intermediate code execution sections; and b3) determination of an appropriate one from said intermediate code execution sections based on the score summed in accordance with each intermediate code execution sections.

2. The intermediate code execution apparatus according to claim 1, wherein said predetermined program language is the Java™ language, and said intermediate code is the Java™ class file including the Java™ bytecode instructions.

3. An intermediate code execution apparatus which executes intermediate code obtained by compiling source code created in a predetermined program language, comprising:

a plurality of intermediate code execution sections which execute the intermediate code; a storage section which stores intermediate code and also stores a correspondence relationship between an instruction included in the intermediate code and appropriateness of each said intermediate code execution sections for efficient execution of said instruction; and an intermediate code interpretation section which executes the following processing:

a) identification of the instructions included in the intermediate code stored in said storage section;

b) determination of an appropriate one from said intermediate code execution sections for efficient execution of the intermediate code based on said identified instructions and said correspondence relationship; and c) recording of a relationship between the intermediate code and said appropriate intermediate code execution section for the intermediate code execution, wherein said correspondence relationship includes a value of a point allocated to each instruction and a range of a total value of said points corresponding to a respective intermediate code execution section, and step b) further includes the following processing:

b1) acquisition of a point of said identified instruction based on said correspondence relationship;

b2) calculation of a total value of acquired points; and b3) determination of an appropriate one from said intermediate code execution sections is based on said correspondence relationship and said calculated total value.

4. The intermediate code execution apparatus according to claim 3, wherein said predetermined program language is the Java™ language, and said intermediate code is the Java™ class file including the Java™ bytecode instructions.

* * * * *